(12) United States Patent
Zhang et al.

(10) Patent No.: US 10,100,700 B2
(45) Date of Patent: Oct. 16, 2018

(54) CANTILEVERED FLOW DISTRIBUTING APPARATUS

(71) Applicant: Tenneco Automotive Operating Company Inc., Lake Forest, IL (US)

(72) Inventors: Yanping Zhang, Livonia, MI (US); Fulun Yang, Ann Arbor, MI (US); Michael Golin, Dexter, MI (US); Daniel J. Owen, Parma, MI (US); William Adams, Parma, MI (US); Meng-Huang Lu, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 105 days.

(21) Appl. No.: 15/182,697

(22) Filed: Jun. 15, 2016

(65) Prior Publication Data

US 2016/0376969 A1    Dec. 29, 2016

Related U.S. Application Data

(60) Provisional application No. 62/186,159, filed on Jun. 29, 2015.

(51) Int. Cl.
*F01N 1/00*    (2006.01)
*F01N 3/10*    (2006.01)
(Continued)

(52) U.S. Cl.
CPC ........ *F01N 3/2892* (2013.01); *B01F 3/04049* (2013.01); *B01F 5/0473* (2013.01);
(Continued)

(58) Field of Classification Search
CPC ........ F01N 3/021; F01N 3/0253; F01N 3/103; F01N 3/206; F01N 3/2066; F01N 3/2892;
(Continued)

(56) References Cited

U.S. PATENT DOCUMENTS 5,799,564 A * 9/1998 Pierce .................. B60T 17/083
                                                        92/129
6,449,947 B1    9/2002 Liu et al.
(Continued)

FOREIGN PATENT DOCUMENTS

CN    101371016 A    2/2009
CN    105378245 A    3/2016
(Continued)

*Primary Examiner* — Phutthiwat Wongwian
*Assistant Examiner* — Diem Tran
(74) *Attorney, Agent, or Firm* — Harness, Dickey & Pierce, P.L.C.

(57) ABSTRACT

An exhaust aftertreatment system may include a housing, an aftertreatment device, and a cantilevered flow distributing element. The housing receives exhaust gas output from an engine and has a main body and an exhaust gas inlet that is angled relative to the main body. The flow distributing element is disposed within the housing upstream of the exhaust aftertreatment device and includes a baffle plate and a collar. The baffle plate is attached to an inner wall of the main body. The collar may include a plurality of first apertures, a downstream axial edge and an upstream axial edge. A portion of the downstream axial edge may abut an upstream-facing surface of the baffle plate. The baffle plate may have a plurality of second apertures extending through the upstream-facing surface. The collar may extend across and partially block at least some of the second apertures.

18 Claims, 5 Drawing Sheets

(51) Int. Cl.
*F01N 3/02* (2006.01)
*F01N 3/00* (2006.01)
*F01N 3/28* (2006.01)
*F01N 13/00* (2010.01)
*F01N 3/20* (2006.01)
*F01N 3/021* (2006.01)
*F01N 3/025* (2006.01)
*B01F 5/04* (2006.01)
*B01F 5/06* (2006.01)
*B01F 3/04* (2006.01)

(52) U.S. Cl.
CPC .......... *B01F 5/0688* (2013.01); *B01F 5/0689* (2013.01); *F01N 3/021* (2013.01); *F01N 3/0253* (2013.01); *F01N 3/103* (2013.01); *F01N 3/206* (2013.01); *F01N 3/2066* (2013.01); *F01N 13/0097* (2014.06); *F01N 2240/20* (2013.01); *F01N 2470/04* (2013.01); *F01N 2470/18* (2013.01); *F01N 2610/02* (2013.01); *Y02T 10/24* (2013.01)

(58) Field of Classification Search
CPC ............. F01N 2610/02; F01N 2470/04; F01N 2470/18; F01N 2240/20; F01N 13/0097; B01F 3/04049; B01F 5/0473; B01F 5/0688; B01F 5/0689; Y02T 10/24

USPC .................................. 60/286, 301, 303, 324
See application file for complete search history.

(56) References Cited

U.S. PATENT DOCUMENTS

| | | | |
|---|---|---|---|
| 6,722,123 | B2 | 4/2004 | Liu et al. |
| 7,562,521 | B2 | 7/2009 | Shirai et al. |
| 7,980,069 | B2 | 7/2011 | Arellano et al. |
| 8,499,548 | B2 | 8/2013 | De Rudder et al. |
| 8,899,022 | B2 | 12/2014 | Haverkamp et al. |
| 8,932,530 | B2 | 1/2015 | Iijima et al. |
| 8,991,160 | B2 | 3/2015 | Katou et al. |
| 9,512,767 | B2 | 12/2016 | De Rudder |
| 2007/0274877 | A1 | 11/2007 | Bush et al. |
| 2012/0144812 | A1 | 6/2012 | Hyun |
| 2015/0135683 | A1 | 5/2015 | Petry |

FOREIGN PATENT DOCUMENTS

| | | | |
|---|---|---|---|
| CN | 105452624 A | | 3/2016 |
| DE | 4121940 A1 | | 1/1993 |
| DE | 102008031136 A1 | | 1/2010 |
| EP | 2607641 | * | 6/2013 |
| JP | 2009030560 A | | 2/2009 |
| JP | 2009228484 A | | 10/2009 |

* cited by examiner

| | Number of Attachment Nodes | Baffle Plate | Frequency, Hz |
|---|---|---|---|
| Design 1 | 4 | Flat | 160.2 |
| Design 2 | 4 | Crowned | 229.8 |
| Design 3 | 6 | Crowned | 350.2 |
| Design 4 | 8 | Crowned | 382.1 |

CANTILEVERED FLOW DISTRIBUTING APPARATUS

CROSS-REFERENCE TO RELATED APPLICATIONS

This application claims the benefit of U.S. Provisional Application No. 62/186,159, filed on Jun. 29, 2015. The entire disclosure of the above application is incorporated herein by reference.

FIELD

The present disclosure relates to an exhaust aftertreatment system having a cantilevered flow distributing apparatus.

BACKGROUND

This section provides background information related to the present disclosure and is not necessarily prior art.

In an attempt to reduce the quantity of $NO_x$ and particulate matter emitted to the atmosphere during internal combustion engine operation, a number of exhaust aftertreatment devices have been developed. Typical aftertreatment systems for diesel engine exhaust may include a diesel oxidation catalyst (DOC), a diesel particulate filter (DPF), and a selective catalytic reduction (SCR) catalyst, a reductant injector and/or a hydrocarbon injector. A mixer or flow distributing element is typically provided for mixing the injected reductant or hydrocarbon with the exhaust gas upstream of a catalyst or filter. Flow distribution elements may also spread the flow over more surface area of the catalyst or filter to maximize the effectiveness of the catalyst or filter. Without such exhaust flow distributing elements, a percentage of catalyst or filter surface area may be unused or underutilized.

While these systems may have performed well in the past, it may be desirable to provide an improved flow distributing element that more efficiently and effectively mixes the reductant or fuel with the exhaust gas, has improved structural durability and product life, and does not create unacceptable backpressure within the exhaust system.

SUMMARY

This section provides a general summary of the disclosure, and is not a comprehensive disclosure of its full scope or all of its features.

An aspect of the present disclosure provides an exhaust aftertreatment device that may include a housing having an inlet, an end chamber, a catalyst bed, and a cantilevered flow distributing element disposed between the end chamber and the catalyst bed. The cantilevered flow distributing element includes a baffle plate and a cantilevered collar, the cantilevered collar including a proximal end and a distal end, the proximal end being affixed to the baffle plate at a plurality of attachment nodes. The baffle plate includes a first plurality of apertures. The cantilevered collar includes a second plurality of aperture. The second plurality of apertures may be orientated substantially perpendicular to the first plurality of apertures.

Another aspect of the present disclosure provides an exhaust aftertreatment device that may include a first exhaust conduit extending in a first axial direction and second exhaust conduit extending in a second axial direction. The first axial direction may be angled with respect to the second axial direction. The second exhaust conduit may include an end chamber at an upstream end of the second exhaust conduit, a catalyst at a downstream end of the second exhaust conduit, and a cantilevered flow distributing element disposed between the end chamber and the catalyst. The end chamber is in fluid communication with the first exhaust conduit. The cantilevered flow distributing element includes a baffle plate and a cantilevered collar affixed to the baffle plate at a plurality of attachment nodes. The baffle plate includes a first plurality of apertures permitting exhaust gas to flow from the end chamber to the catalyst. The cantilevered collar includes a second plurality of apertures permitting exhaust gas to flow therethrough in a direction perpendicular to the second axial direction.

Another aspect of the present disclosure provides an exhaust aftertreatment system that may include a housing, an exhaust aftertreatment device, and a cantilevered flow distributing element. The housing may receive exhaust gas output from a combustion engine and may have a main body and an exhaust gas inlet that is angled relative to the main body. The exhaust aftertreatment device (e.g., a particulate filter, an oxidation catalyst and/or a selective catalytic reduction catalyst) is disposed within the main body. The cantilevered flow distributing element is disposed within the housing upstream of the exhaust aftertreatment device. The flow distributing element may include a baffle plate and a collar fixed to the baffle plate. The baffle plate includes a radially outer periphery that may be attached to an inner circumferential wall of the main body. The collar may include a plurality of first apertures, a downstream axial edge and an upstream axial edge opposite the downstream axial edge. At least a portion of the downstream axial edge may abut an upstream-facing surface of the baffle plate. The baffle plate may have a plurality of second apertures extending through the upstream-facing surface and a downstream-facing surface. The collar may extend across and partially block at least some of the second apertures.

In some configurations, the downstream axial edge of the collar includes a plurality of attachment zones that are circumferentially spaced apart from each other. The attachment zones may be locations at which the downstream axial edge is welded to the baffle plate.

In some configurations, the downstream axial edge includes a plurality of buffer zones. Each of the buffer zones includes a circumferentially extending segment of the downstream axial edge that abuts the upstream-facing surface and is disposed between and directly adjacent to one of the attachment zones and one of a plurality of open zones. The open zones are circumferentially extending segments of the downstream axial edge that extend across and partially block some of the second apertures.

In some configurations, each of the attachment zones includes a tab that projects into one of a plurality of slots in the baffle plate. The welds may be applied along some or all of the circumferential lengths of the tabs.

In some configurations, a sum of circumferential lengths of all of the attachment zones is 32%-36% of a total circumference of the downstream axial edge of the collar.

In some configurations, a sum of circumferential lengths of all of the attachment zones and all of the buffer zones is 64%-68% of the total circumference of the downstream axial edge of the collar.

In some configurations, a sum of circumferential lengths of all of the open zones is 32%-38% of the total circumference of the downstream axial edge of the collar.

In some configurations, the upstream-facing surface of the baffle plate extends axially upstream such that central portion of the upstream-facing surface is disposed upstream relative to the radially outer periphery of the baffle plate.

In some configurations, the collar is a tubular member that extends entirely around a longitudinal axis of the baffle plate.

In some configurations, the collar extends circumferentially around only a portion of a longitudinal axis of the baffle plate.

In some configurations, the housing defines an end chamber at an intersection of longitudinal axes of the main body and the inlet. The exhaust aftertreatment device is disposed within the main body downstream of the end chamber.

In some configurations, the collar may extend into the end chamber.

In some configurations, the baffle plate and the collar have longitudinal axes that are coincident with the longitudinal axis of the main body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
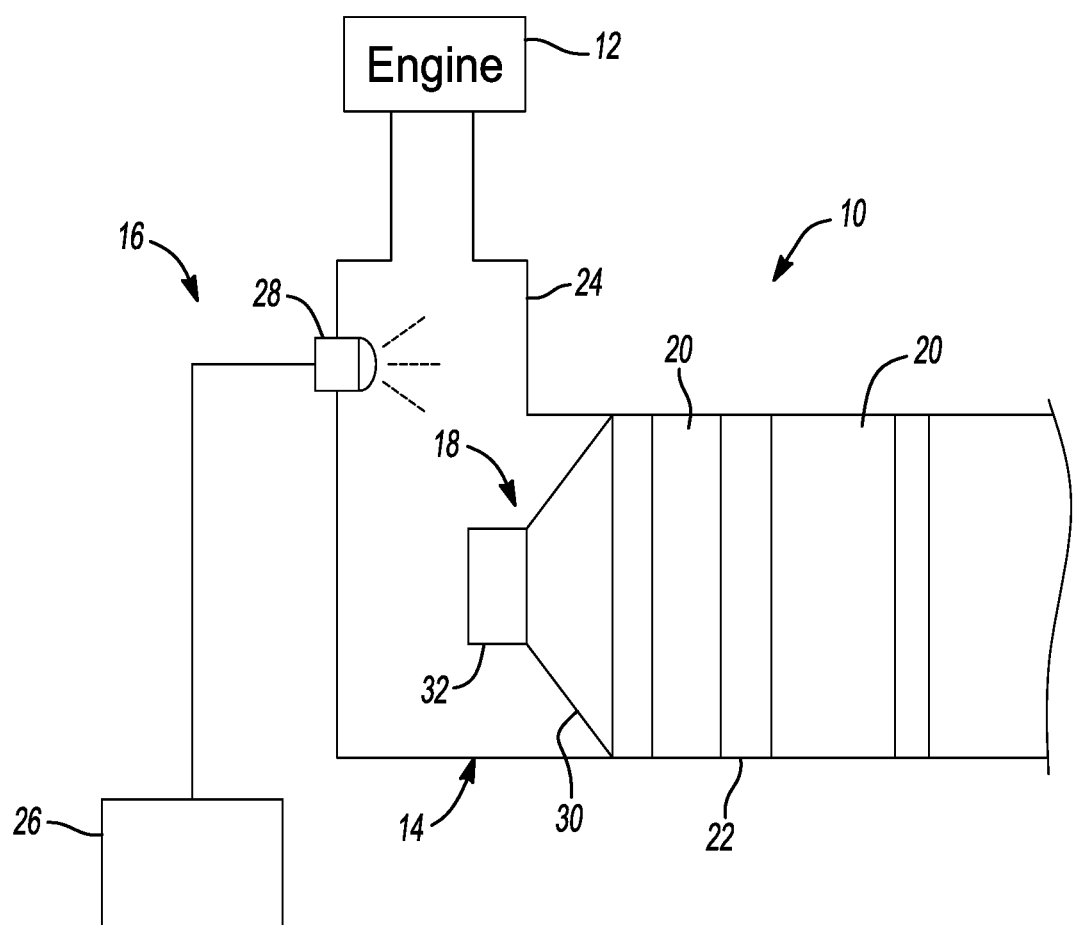
FIG. 1 is a schematic representation of a combustion engine and an exhaust aftertreatment system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, an exhaust aftertreatment system 10 is provided that may treat exhaust gas output by a combustion engine 12. The exhaust aftertreatment system 10 may include a housing 14, a fluid delivery system 16, a cantilevered flow distributing element 18, and one or more aftertreatment devices 20. The housing 14 may receive exhaust gas discharged from the combustion engine 12. Exhaust gas received by the housing 14 may flow through the flow distributing element 18 and the one or more aftertreatment devices 20 before being discharged to the ambient environment.

The aftertreatment devices 20 may include a diesel oxidation catalyst (DOC), a diesel particulate filter (DPF), a selective-catalytic-reduction (SCR) catalyst, and/or any other exhaust aftertreatment component. The DOC may be utilized to oxidize hydrocarbons and carbon monoxide of the exhaust gas and oxidize nitrogen monoxide to nitrogen dioxide. The DPF may include a catalyst support for trapping particulate matter (PM) entrained in the exhaust gas, and the catalyst support eliminates the PM through a chemical reaction. The SCR catalyst may convert nitrogen oxides in the exhaust gas to nitrogen ($N_2$), water and/or carbon dioxide, for example.

Figure 3:
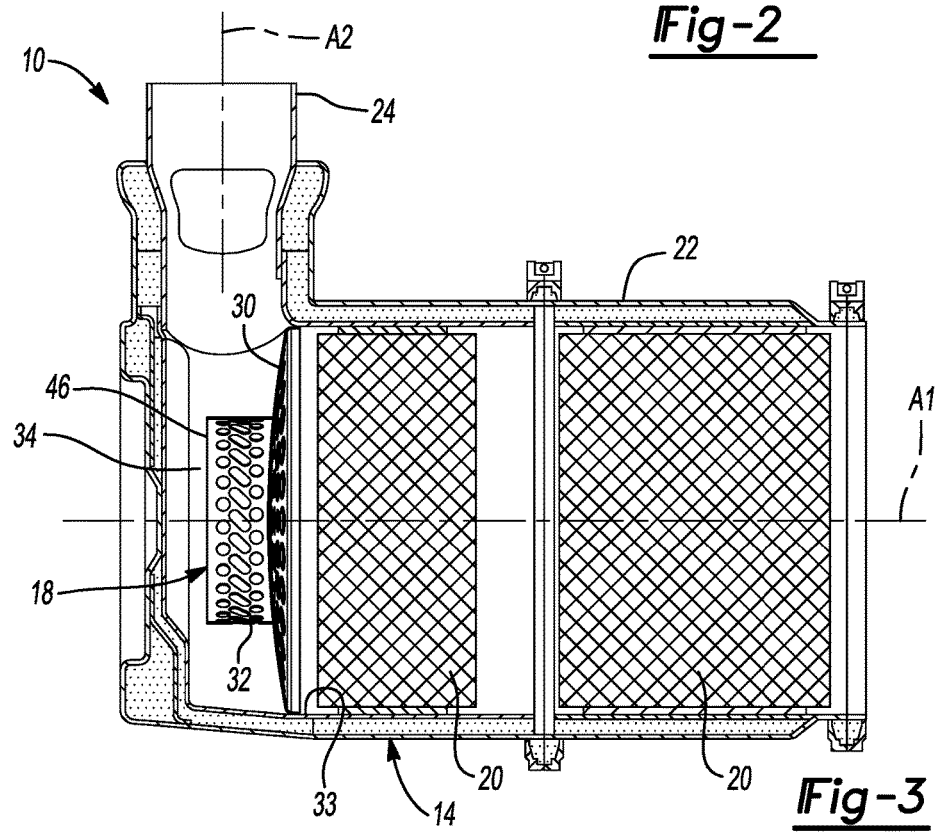
FIG. 3 is a cross-sectional view of the housing taken along line 3-3 of FIG. 2.

The housing 14 may include a main body 22 and an inlet 24. The main body 22 may be defined by a first longitudinal axis A1 (FIG. 3), and the inlet 24 may be defined by a second longitudinal axis A2 (FIG. 3) that is angled relative to the first longitudinal axis A1. While FIG. 3 depicts a ninety-degree angle between the first and second longitudinal axes A1, A2, it will be appreciated that the angle between the first and second longitudinal axes A1, A2 could be greater than or less than ninety degrees. The flow distributing element 18 and the aftertreatment devices 20 may be at least partially disposed in the main body 22.

The fluid delivery system 16 may pump a fluid (e.g., a hydrocarbon fuel or reductant such as urea or ammonia) from a tank 26 to an injector 28 that may spray the fluid into the exhaust stream within the housing 14 at or upstream of the flow distributing element 18. The flow distributing element 18 may mix the fluid with the exhaust gas to provide a more uniform mixture of the fluid and exhaust gas before the mixture enters the aftertreatment device 20.

As shown in FIGS. 1 and 3, the flow distributing element 18 may be disposed within the housing 14 at a location upstream of the aftertreatment devices 20 (e.g., between the inlet 24 and the aftertreatment devices 20). The flow distributing element 18 may include a baffle plate (or partition plate) 30 and a collar (e.g., a tubular or semi-tubular cantilevered plate) 32. The baffle plate 30 may be fixed to an inner diametrical wall 33 of the main body 22 of the housing 14. The baffle plate 30 and collar 32 may be centered on the first longitudinal axis A1 (i.e., longitudinal axes of the baffle plate 30 and collar 32 may be coincident with the first longitudinal axis A1). As shown in FIG. 3, the collar 32 is fixed to the baffle plate 30 and may extend axially into an end chamber 34 of the housing 14 (i.e., an area of the housing 14 at which the first and second longitudinal axes A1, A2 intersect). In this manner, the flow distributing element 18 separates the end chamber 34 from the aftertreatment device(s) 20. The flow distributing element 18 alters the flow characteristics of the radially incoming exhaust gas from the inlet 24 to promote improved uniformity of the flow prior to the exhaust gas interacting with the aftertreatment device(s) 20 within the housing 14.

Referring now to FIGS. 3-6, the baffle plate 30 can be a circular plate having a plurality of flow apertures 36 through which exhaust gas can flow from the end chamber 34 to the aftertreatment device(s) 20. The flow apertures 36 can have any shape and size, including but not limited to circular, elliptical, or elongate. In some configurations, the flow apertures 36 may include louvers (not shown) that may create a swirling flow downstream of the flow apertures 36. As shown in FIG. 3, a profile of the baffle plate 30 can be crowned or frusto-conical. In some configurations, an upstream-facing axial end surface 38 (FIG. 4) of the baffle plate 30 is convex, and a downstream-facing axial end surface 40 (FIG. 5) of the baffle plate 30 is concave). The flow apertures 36 extend through the axial end surfaces 38, 40. In some configurations, the baffle plate 30 may have a substantially flat or planar profile (i.e., the axial end surfaces 38, 40 may be planar).

The collar 32 may be a rolled tube having a substantially cylindrical shape. A downstream axial edge 42 of the collar 32 is attached thereto via a plurality of attachment nodes 44. While the particular configuration shown in FIGS. 4-6 includes eight attachment nodes 44, the flow distributing element 18 could include a different number of attachment nodes 44. An upstream axial edge 46 of the collar 32 extends into the end chamber 34 and is unsupported. In this manner, the collar 32 is a cantilevered tube within the housing 14. That is, the collar 32 is supported only at the downstream axial edge 42 and is not supported by any other structure elsewhere. In fact, the entire flow distributing element 18 may be cantilevered (i.e., supported only by the inner circumferential wall 33 of the housing 14 at the radially outer periphery of the baffle plate 30 and completely unsupported elsewhere).

Figure 2:
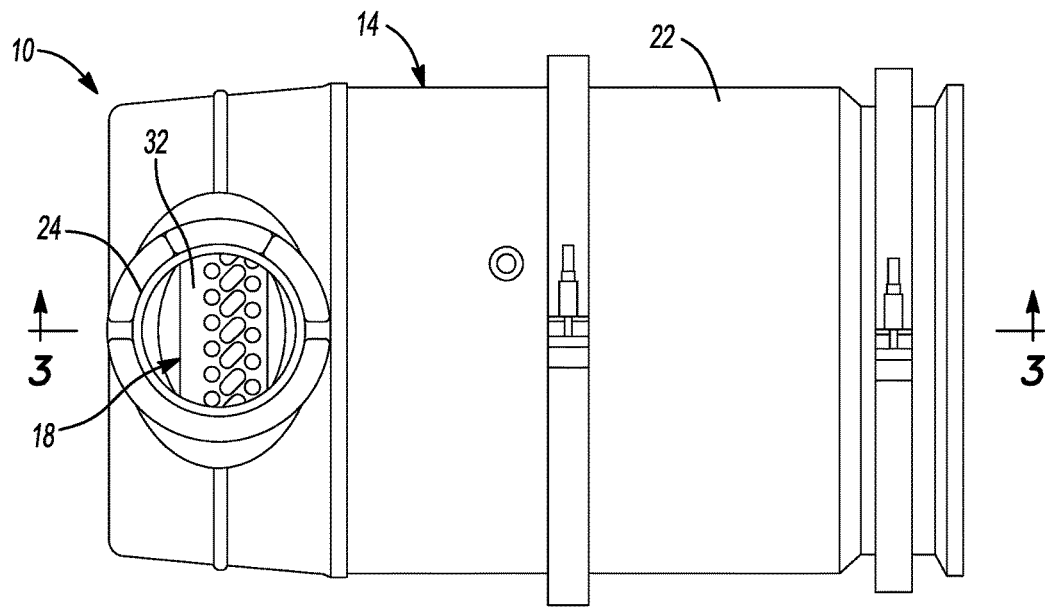
FIG. 2 is a top view of a housing of the exhaust aftertreatment system with a cantilevered flow distributing element disposed therein.
Figure 4:
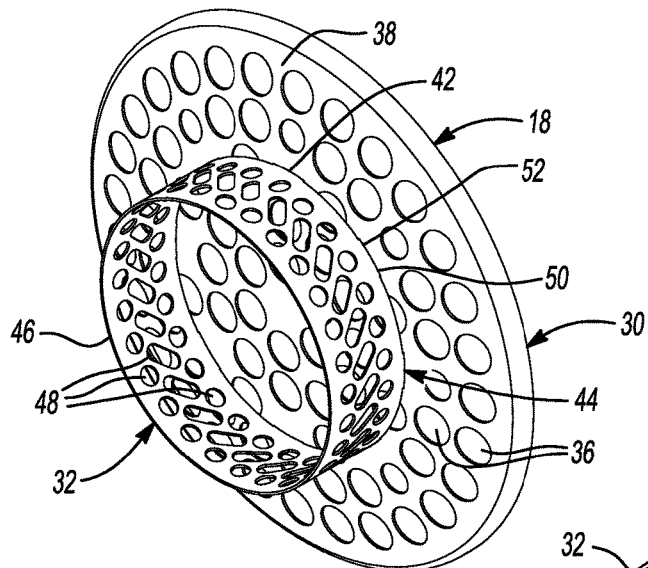
FIG. 4 is a perspective view of the cantilevered flow distributing element.

The collar 32 may include a plurality of flow apertures 48. As shown in FIG. 4, the flow apertures 48 can have a circular shape or an elongated obround shape, for example. It will be appreciated, however, that the size, shape and arrangement of the flow apertures 48 may be chosen to promote specific flow characteristics (e.g., swirling). For example, some of the flow apertures 48 may be elongated and angled 45 degrees with respect to the first longitudinal axis A1. The elongated and angled flow apertures 48 may all be orientated in a common direction clockwise or counterclockwise to promote a rotating flow, or they can be orientated at one angle over a portion of the collar 32 and at a different angle on another portion of the collar 32 so as to promote flow toward a selected region of the exhaust aftertreatment device(s) 20. The configuration of round flow apertures 48 and elongated angled flow apertures 48 shown in FIGS. 2-4 may provide several performance benefits. Namely, this configuration may increase the flow of gas in and out of the collar 32, improve the uniformity of the flow, reduce flow backpressure and increase the stiffness of the collar 32.

Figure 5:
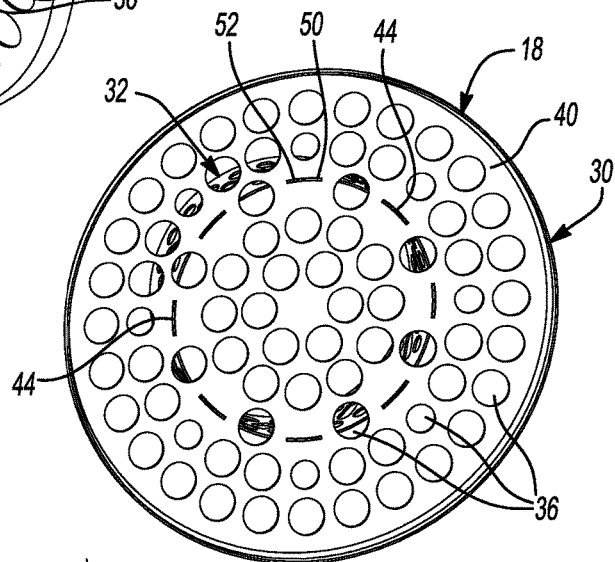
FIG. 5 is another perspective view of the cantilevered flow distributing element.
Figure 6:
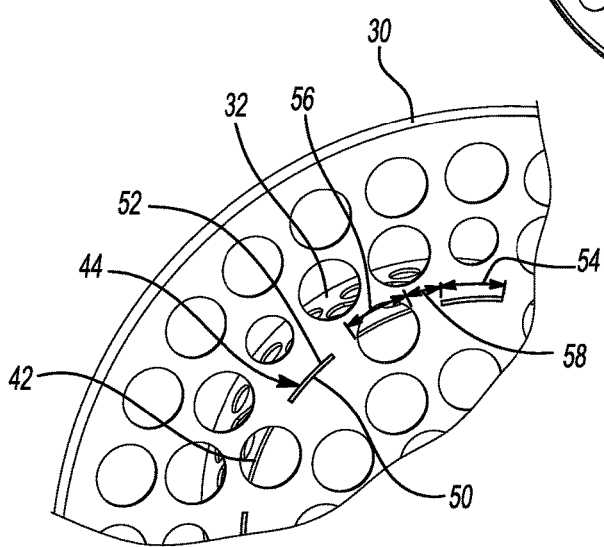
FIG. 6 is an enlarged view of a portion of the cantilevered flow distributing element shown in FIG. 5.

In some configurations, the downstream axial edge 42 of the collar 32 includes one or more projecting tabs 50 and the baffle plate 30 includes a corresponding plurality of slots 52 sized to receive the projecting tabs 50 therethrough, as shown in FIGS. 4-6. In such configurations, welds may be formed along the projecting tabs 50 to fixedly attach the collar 32 to the baffle plate 30. Positioning the welds along the tabs 50 may reduce distortion of the collar 32 and/or baffle plate 30 as a result of the welding process. In such configurations, the projecting tabs 50, slots 52, and welds define the attachment nodes 44. In some configurations, the sizes and/or locations of the tabs 50 and slots 52 can be configured to control the orientation (e.g., the clocking) of the collar 32 relative to the baffle plate 30 (i.e., the tabs 50 and slots 52 could be configured such that the tabs 50 can only be inserted into the slots 52 when the collar 32 is properly rotationally oriented relative to the baffle plate 30). In some configurations, the attachment nodes 44 could include additional or alternative joining means. In some configurations, the downstream axial edge 42 of the collar 32 may not include the projecting tabs 50 and slots 52 and may abut the baffle plate 30 over its entire circumference and the welds alone may define attachment nodes 44.

As shown in FIG. 6, the interface of the downstream axial edge 42 and the baffle plate 30 can be divided into zones including a plurality of first zones 54, a plurality of second zones 56 and a plurality of third zones 58. The first zones (attachment zones 54) include the attachment nodes 44 at which the downstream axial edge 42 of the collar 32 is mechanically joined to the baffle plate 30. In some configurations, the attachment zones 54 do not span, intersect or abut any flow apertures 36 in the baffle plate 30. In other configurations, one or more of the attachment zones 54 may intersect the flow apertures 36.

In each of the second zones (open zones 56), the downstream axial edge 42 of the collar 32 spans across one of the flow apertures 36 in the baffle plate 30. In the open zones 56, the downstream axial edge 42 of the collar 32 may extend across and partially block the flow of exhaust through the flow apertures 36, thereby reducing the overall flow area through the baffle plate 30 and increasing backpressure in the exhaust system. If a reduction in backpressure is desired, the amount of the portions of the downstream axial edge 42 in the open zones 56 may be reduced to increase the flow area, and thus reduce the backpressure. In some configurations, the downstream axial edge 42 may have one or more apertures or cutouts that are aligned with and open to one or more of the apertures 36 to reduce backpressure. Having the downstream axial edge 42 traverse some of the flow apertures 36 provides a further advantage of premixing exhaust flow that has passed through the flow apertures 48 with the exhaust flow that has not passed through the flow apertures 48 before the combined flow travels through the flow apertures 36. That is, three flow paths are define through each of such flow apertures 36 that are traversed by the downstream axial edge 42: (1) flow through the flow aperture 36 radially outside of the collar 32, (2) flow through the flow aperture 36 that is radially inside of the collar 32, and (3) flow through one of the flow apertures 48 in the collar 32 before flowing through the flow aperture 36.

The third zones (buffer zones 58) are the spaces located circumferentially (i.e., angularly) between adjacent attachment zones 54 and open zones 56. That is, each buffer zone 58 is defined as the space that is circumferentially between one of the attachment zones 54 and an immediately adjacent one of the open zones 56. The buffer zones 58 do not span any portion of any of the flow apertures 36 and act to increase the stiffness of the flow distributing element 18.

Figure 7:
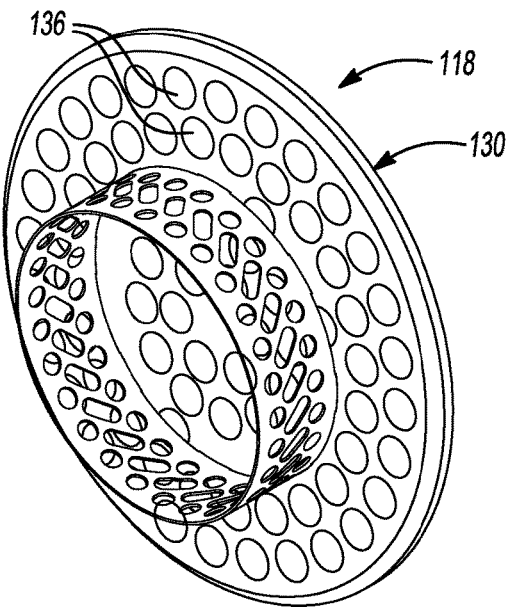
FIG. 7 is perspective view of another cantilevered flow distributing element according to the principles of the present disclosure.

Referring now to FIG. 7, another cantilevered flow distributing element 118 is provided that may incorporated into the exhaust aftertreatment system 10 instead of the cantilevered flow distributing element 18. The flow distributing element 118 may be similar or identical to the flow distributing element 18 described above, except a baffle plate 130 of the flow distributing element 118 may include a configuration of flow apertures 136 that differs from the configuration of flow apertures 36 in the baffle plate 30. As shown in FIG. 7, all of the flow apertures 136 in the baffle plate 130 have substantially the same diameters, unlike the flow apertures 36 in the baffle plate 30, some of which have larger or smaller diameters.

Figure 8:
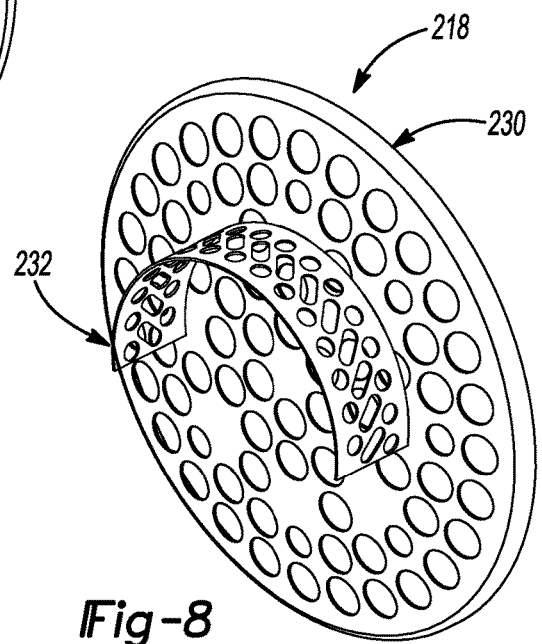
FIG. 8 is a perspective view of yet another cantilevered flow distributing element according to the principles of the present disclosure.

Referring now to FIG. 8, another cantilevered flow distributing element 218 is provided that may be incorporated into the system 10 instead of the cantilevered flow distributing element 18. The flow distributing element 218 includes a baffle plate 230 and a collar 232. The baffle plate 230 may be similar or identical to either of the baffle plates 30, 130. The collar 232 may be similar or identical to the collar 32, except that the collar 232 is not a cylindrical pipe. Rather, the collar 232 is shown as a curved plate spanning approximately 180 degrees around a center point of the baffle plate 230 and disposed about the top half of the baffle plate 230 (i.e., the half of the baffle plate 230 closest to the inlet 24 of the housing 14).

Figure 9:
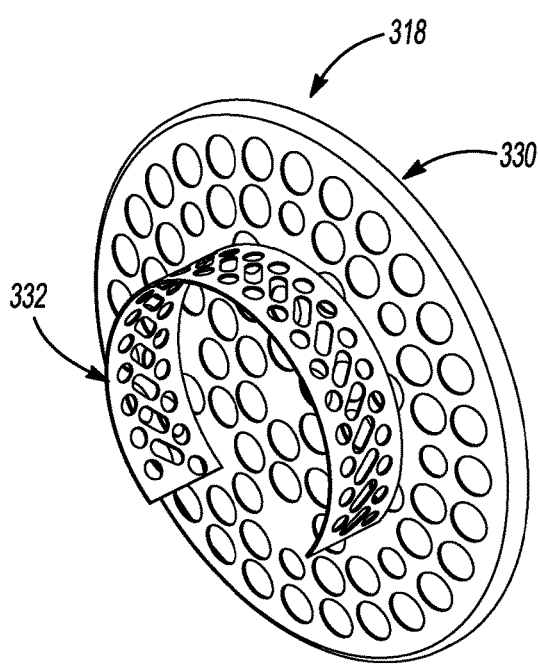
FIG. 9 is a perspective view of yet another cantilevered flow distributing element according to the principles of the present disclosure.

Referring now to FIG. 9, another cantilevered flow distributing element 318 is provided that may be incorporated into the system 10 instead of the cantilevered flow distributing element 18. The flow distributing element 318 includes a baffle plate 330 and a collar 332. The baffle plate 330 may be similar or identical to either of the baffle plates 30, 130, 230. The collar 332 may be similar or identical to the collar 32, except that the collar 332 is not a cylindrical pipe. Rather, the collar 332 is shown as a curved plate spanning approximately 270 degrees around a center point of the baffle plate 330 and disposed about the top portion of the baffle plate 330 (i.e., the portion of the baffle plate 330 closest to the inlet 24 of the housing 14).

Figures 10, 11, 12, 13:
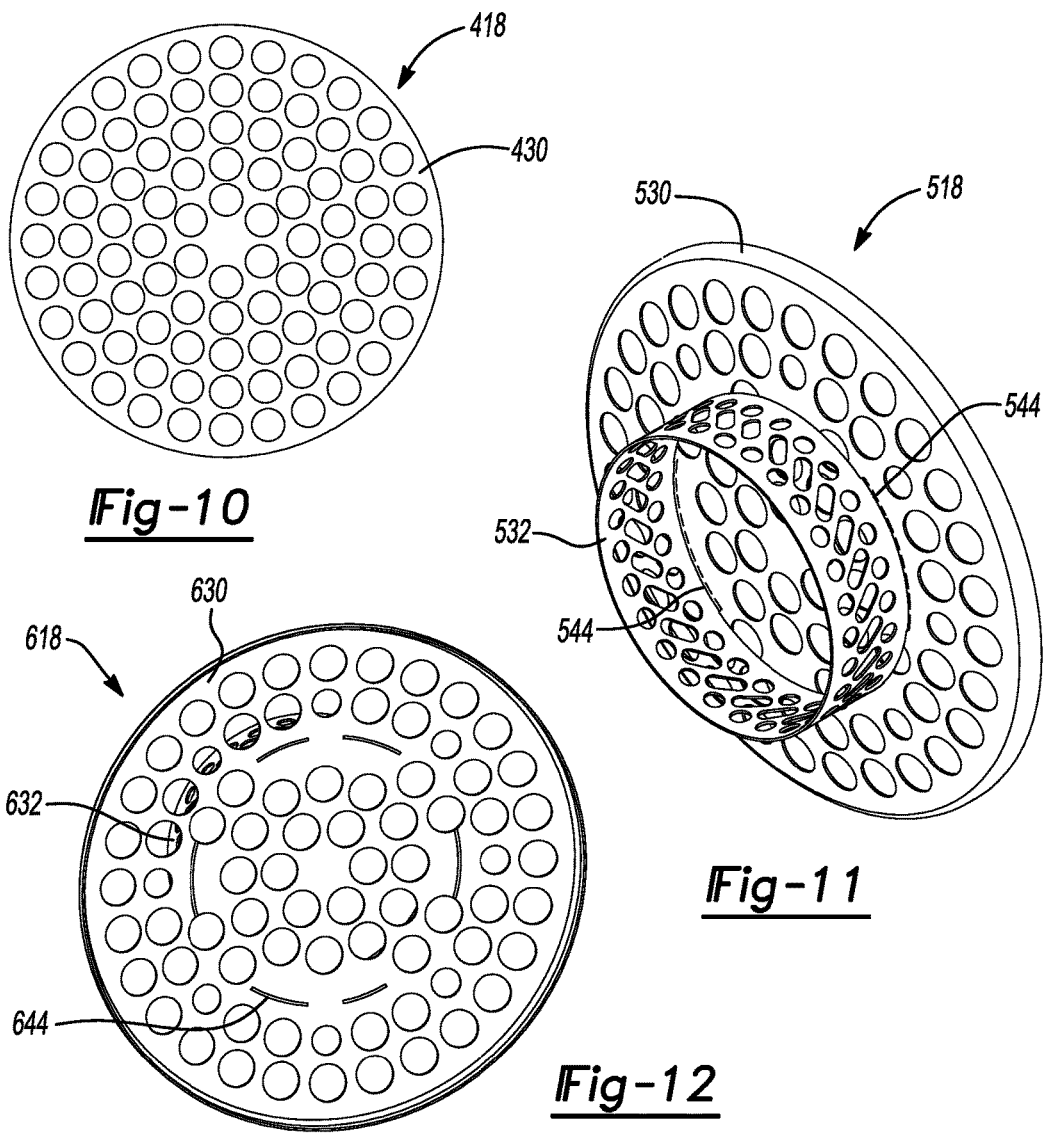
FIG. 10 is a perspective view of yet another flow distributing element according to the principles of the present disclosure.
FIG. 11 is a perspective view of yet another cantilevered flow distributing element according to the principles of the present disclosure.
FIG. 12 is a perspective view of yet another cantilevered flow distributing element according to the principles of the present disclosure.
FIG. 13 is a table including natural frequency values of flow distributing elements with various design parameters.

FIG. 10 provides a flow distributing element 418 (or compact flow modifier) that does not include a collar. The flow distributing element 418 may include a baffle plate 430 that may be similar or identical to the plates 30, 130, 230, 330.

FIG. 11 provides yet another cantilevered flow distributing element 518 that may be incorporated into the exhaust aftertreatment system 10 instead of the flow distributing element 18. The flow distributing element 518 may include a baffle plate 530 and a collar 532 that may be similar or identical to the baffle plate 30 and collar 32, except that the flow distributing element 518 includes two extended attachment nodes 544 that fix the collar 532 to the baffle plate 530. While the performance of the flow distributing element 518 may be adequate in some applications, in other applications, only two attachment nodes 544 for affixing the collar 532 to the baffle plate 530 may fail to provide sufficient structural support for the collar 532 and may adversely affect the natural frequency of the flow distributing element 518.

FIG. 12 provides yet another cantilevered flow distributing element 618 that may be incorporated into the exhaust aftertreatment system 10 instead of the flow distributing element 18. The flow distributing element 618 may include a baffle plate 630 and a collar 632 that may be similar or identical to the baffle plate 30 and collar 32, except that the flow distributing element 618 includes six attachment nodes 644 that fix the collar 632 to the baffle plate 630. While the performance of the flow distributing element 618 may be adequate in some applications, in other applications, having six attachment nodes 644 for affixing the collar 632 to the baffle plate 630 may fail to provide sufficient structural support for the collar 632 and may adversely affect the natural frequency of the flow distributing element 618.

FIG. 13 is a chart showing the natural frequencies of exemplary flow distributing element designs having different numbers of attachment nodes. Resonant vibration may be a significant root cause of fatigue failure of exhaust aftertreatment systems. If the natural frequency of a flow distributing element is within vibration frequency range of the engine 12, the flow distributing element may be more likely to fail due to resonant vibration. For example, for a ten-cylinder engine operating at highway speed, a fifth order engine vibration frequency, which is the dominant frequency, may be approximately 333 Hz. If flow distributing element natural frequency is above 350 Hz (as is the case for Design 4, for example, which has eight attachment nodes, like the configuration shown in FIGS. 4-6), flow distributing element resonant vibration will not occur, which results in improved fatigue life for the flow distributing element. Increasing the relative size of the attachment nodes will increase the flow distributing element vibration frequency, and, thus, improve structural rigidity of the flow distributing element. However, this may result in a relatively smaller open zones which may increase backpressure.

In some configurations, the cantilevered flow distributing element 18, 118, 218, 318 maximizes flow uniformity and structural rigidity and simultaneously minimizes backpressure. Such performance can be achieved by adhering to following general design parameters: (1) a sum of the lengths (i.e., the circumferential lengths) of all of the attachment zones 54 is 32%-36% of a total circumference of the downstream axial edge 42 of the collar 32; (2) a sum of the lengths (i.e., the circumferential lengths) of all of the attachment zones 54 and the buffer zones 58 (i.e., the sum of the combined lengths of the welded and un-welded portions of the attachment nodes) is 64%-68% of a total circumference of the downstream axial edge 42 of the collar 32; and (3) a sum of the lengths (i.e., the circumferential lengths) of all of the open zones 56 is 32%-38% of a total circumference of the downstream axial edge 42 of the collar 32.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust aftertreatment system comprising:
a housing receiving exhaust gas output from a combustion engine and having a main body and an exhaust gas inlet that is angled relative to the main body;
an exhaust aftertreatment device disposed within the main body; and
a cantilevered flow distributing element disposed within the housing upstream of the exhaust aftertreatment device, the flow distributing element including a baffle plate and a collar fixed to the baffle plate, the baffle plate including a radially outer periphery that is attached to an inner circumferential wall of the main body, the collar having a plurality of first apertures, a downstream axial edge and an upstream axial edge opposite the downstream axial edge, at least a portion of the downstream axial edge abuts an upstream-facing surface of the baffle plate, the baffle plate having a plurality of second apertures extending through the upstream-facing surface, the collar extending across and partially blocking at least some of the second apertures, wherein the upstream-facing surface of the baffle plate extends axially upstream such that a central portion of the upstream-facing surface is disposed upstream relative to the radially outer periphery of the baffle plate.

2. The exhaust aftertreatment system of claim 1, wherein the downstream axial edge of the collar includes a plurality of attachment zones that are circumferentially spaced apart from each other, wherein the attachment zones are locations at which the downstream axial edge is welded to the baffle plate.

3. The exhaust aftertreatment system of claim 2, wherein the downstream axial edge includes a plurality of buffer zones, each of the buffer zones including a circumferentially extending segment of the downstream axial edge that abuts the upstream-facing surface and is disposed between and directly adjacent to one of the attachment zones and one of a plurality of open zones, wherein the open zones are circumferentially extending segments of the downstream axial edge that extend across and partially block some of the second apertures.

4. The exhaust aftertreatment system of claim 3, wherein each of the attachment zones includes a tab that projects into one of a plurality of slots in the baffle plate, and wherein the welds are applied along circumferential lengths of the tabs.

5. The exhaust aftertreatment system of claim 4, wherein a sum of circumferential lengths of all of the attachment zones is 32%-36% of a total circumference of the downstream axial edge of the collar.

6. The exhaust aftertreatment system of claim 5, wherein a sum of circumferential lengths of all of the attachment zones and all of the buffer zones is 64%-68% of the total circumference of the downstream axial edge of the collar.

7. The exhaust aftertreatment system of claim 6, wherein a sum of circumferential lengths of all of the open zones is 32%-38% of the total circumference of the downstream axial edge of the collar.

8. The exhaust aftertreatment system of claim 1, wherein the collar is a tubular member that extends entirely around a longitudinal axis of the baffle plate.

9. The exhaust aftertreatment system of claim 1, wherein the collar extends circumferentially around only a portion of a longitudinal axis of the baffle plate.

10. The exhaust aftertreatment system of claim 1, wherein the exhaust aftertreatment device is one of a particulate filter, an oxidation catalyst and a selective catalytic reduction catalyst.

11. An exhaust aftertreatment system comprising:
a housing receiving exhaust gas output from a combustion engine and having a main body and an exhaust gas inlet that is angled relative to the main body, the housing defining an end chamber at an intersection of longitudinal axes of the main body and the inlet;
an exhaust aftertreatment device disposed within the main body downstream of the end chamber; and
a cantilevered flow distributing element disposed within the housing upstream of the exhaust aftertreatment device, the flow distributing element including a baffle plate and a collar fixed to the baffle plate, the collar extending into the end chamber, the baffle plate including a radially outer periphery that is attached to an inner circumferential wall of the main body, the collar having a plurality of first apertures, a downstream axial edge and an upstream axial edge opposite the downstream axial edge, at least a portion of the downstream axial edge abuts an upstream-facing surface of the baffle plate, the baffle plate having a plurality of second apertures extending through the upstream-facing surface, the collar extending across and partially blocking at least some of the second apertures, wherein the upstream-facing surface of the baffle plate extends axially upstream such that a central portion of the upstream-facing surface is disposed upstream relative to the radially outer periphery of the baffle plate.

12. The exhaust aftertreatment system of claim 11, wherein the downstream axial edge of the collar includes a plurality of attachment zones that are circumferentially spaced apart from each other, wherein the attachment zones are locations at which the downstream axial edge is welded to the baffle plate, wherein the downstream axial edge includes a plurality of buffer zones, each of the buffer zones including a circumferentially extending segment of the downstream axial edge that abuts the upstream-facing surface and is disposed between and directly adjacent to one of the attachment zones and one of a plurality of open zones, and wherein the open zones are circumferentially extending segments of the downstream axial edge that extend across and partially block some of the second apertures.

13. The exhaust aftertreatment system of claim 12, wherein each of the attachment zones includes a tab that projects into one of a plurality of slots in the baffle plate, and wherein the welds are applied along circumferential lengths of the tabs.

14. The exhaust aftertreatment system of claim 13, wherein a sum of circumferential lengths of all of the attachment zones is 32%-36% of a total circumference of the downstream axial edge of the collar.

15. The exhaust aftertreatment system of claim 14, wherein a sum of circumferential lengths of all of the attachment zones and all of the buffer zones is 64%-68% of the total circumference of the downstream axial edge of the collar.

16. The exhaust aftertreatment system of claim 15, wherein a sum of circumferential lengths of all of the open zones is 32%-38% of the total circumference of the downstream axial edge of the collar.

17. The exhaust aftertreatment system of claim 11, wherein the collar is a tubular member that extends entirely around the longitudinal axis of the baffle plate.

18. The exhaust aftertreatment system of claim 11, wherein the collar extends circumferentially around only a portion of the longitudinal axis of the baffle plate.

* * * * *